(12) United States Patent
Bitran et al.

(10) Patent No.: US 8,045,652 B1
(45) Date of Patent: Oct. 25, 2011

(54) EFFICIENT DECODING OF SPATIALLY-MULTIPLEXED SIGNALS

(75) Inventors: Yigal Bitran, Ramat HaSharon (IL); Itay Lusky, Hod Hasharon (IL); Ariel Yagil, Ramat HaSharon (IL)

(73) Assignee: Altair Semiconductor Ltd., Hod Hasharon (IL)

( * ) Notice: Subject to any disclaimer, the term of this patent is extended or adjusted under 35 U.S.C. 154(b) by 864 days.

(21) Appl. No.: 12/029,142

(22) Filed: Feb. 11, 2008

Related U.S. Application Data

(60) Provisional application No. 60/901,169, filed on Feb. 13, 2007.

(51) Int. Cl.
*H04L 27/06* (2006.01)
(52) U.S. Cl. ........ 375/341; 370/203; 375/262; 375/340; 714/794
(58) Field of Classification Search ................. None
See application file for complete search history.

(56) References Cited

U.S. PATENT DOCUMENTS

| | | | | |
|---|---|---|---|---|
| 2006/0146965 | A1* | 7/2006 | Kwun et al. | 375/341 |
| 2006/0227903 | A1* | 10/2006 | Niu et al. | 375/340 |
| 2007/0268813 | A1* | 11/2007 | Muquet et al. | 370/203 |

FOREIGN PATENT DOCUMENTS

WO    WO-2006/135141    12/2006

OTHER PUBLICATIONS

Agrell et al., "Closest Point Search in Lattices", IEEE Transactions on Information Theory, vol. 48, No. 8, Aug. 2002, pp. 2201-2214.
Damen et al., "On-Maximum-Likelihood Detection and the Search for the Closest Lattice Point", IEEE Transactions on Information Theory, vol. 49, No. 10, Oct. 2003, pp. 2389-2402.
Studer, et al., "Soft Output Sphere Decoding; Performance and Implementation Aspects", Proceedings of the 40th Asilomar Conference on Signals, Systems, and Computers, Pacific Grove, California, Nov. 2006, pp. 2071-2076.
U.S. Appl. No. 60/901,169, filed Feb. 13, 2007.

* cited by examiner

*Primary Examiner* — David C. Payne
*Assistant Examiner* — Adolf Dsouza
(74) *Attorney, Agent, or Firm* — D. Kligler I.P. Services Ltd.

(57) ABSTRACT

A method for communication includes receiving a spatially-multiplexed signal using multiple receivers to produce multiple respective received signals. The spatially-multiplexed signal includes multiple simultaneously-transmitted symbols, which are selected from respective sets of constellation symbols, each constellation symbol representing a respective set of values of a group of data bits. Combinations of the constellation symbols are traversed iteratively. Each combination includes one constellation symbol from each of the sets of the constellation symbols and represents N data bits. The traversed combinations are searched for a combination that matches the received signals. During traversal of the combinations, at least 2N measures of likelihood regarding the values of the data bits represented by each traversed combination are accumulated. The accumulated measures of likelihood are processed to produce soft bit metrics. The values of the data bits carried by the multiple transmitted symbols are reconstructed responsively to the soft bit metrics.

40 Claims, 4 Drawing Sheets

EFFICIENT DECODING OF SPATIALLY-MULTIPLEXED SIGNALS

CROSS-REFERENCE TO RELATED APPLICATIONS

This application claims the benefit of U.S. Provisional Patent Application 60/901,169, filed Feb. 13, 2007, whose disclosure is incorporated herein by reference.

FIELD OF THE INVENTION

The present invention relates generally to communication systems, and particularly to methods and systems for decoding spatially-multiplexed signals.

BACKGROUND OF THE INVENTION

Some communication systems, commonly referred to as Multiple-Input Multiple-Output (MIMO) systems, transmit and receive simultaneously using multiple transmit and receive antennas. Some MIMO systems use the multiple transmit and receive antennas to provide enhanced capacity by applying spatial multiplexing of signals. In a typical spatial multiplexing scheme, two or more signals, which carry different data streams, are transmitted simultaneously via different transmit antennas. The signals are received by a receiver having multiple receive antennas. The receiver performs joint detection of the multiple received signals.

Several methods for joint detection of spatially-multiplexed signals are known in the art. For example, Agrell et al., provide a survey of several closest-point search methods that can be used for signal detection in "Closest Point Search in Lattices," IEEE Transactions on Information Theory, volume 48, number 8, August 2002, pages 2201-2214, which is incorporated herein by reference.

As another example, Damen et al., describe several Maximum-Likelihood (ML) decoding algorithms for Gaussian MIMO linear channels in "On Maximum-Likelihood Detection and the Search for the Closest Lattice Point," IEEE Transactions on Information Theory, volume 49, number 10, October 2003, pages 2389-2402, which is incorporated herein by reference. Another method for decoding a spatially-multiplexed signal, and an associated receiver, are described in U.S. Patent Application Publication 2007/0268813, whose disclosure is incorporated herein by reference.

Some joint detection methods provide soft outputs. For example, PCT Application WO 2006/135141, whose disclosure is incorporated herein by reference, describes a soft output sphere decoding method for a MIMO system. The method includes the steps of detecting a ML symbol nearest to a received signal, calculating a lattice point nearest to the received signal and having a symbol bit opposite to the detected ML symbol for all bits of the received signal, and calculating a ratio between a distance from the received signal to the detected ML symbol and a distance from the received signal to the calculated lattice points for each bit.

Studer et al., describe several performance-complexity trade-offs in the implementation of soft output sphere decoders in "Soft Output Sphere Decoding: Performance and Implementation Aspects," Proceedings of the 40$^{th}$ Asilomar Conference on Signals, Systems, and Computers, Pacific Grove, Calif., November 2006, pages 2071-2076, which is incorporated herein by reference.

SUMMARY OF THE INVENTION

Embodiments of the present invention provide a method for communication, including:

receiving a spatially-multiplexed signal using multiple receivers to produce multiple respective received signals, the spatially-multiplexed signal including multiple simultaneously-transmitted symbols, which are selected from respective sets of constellation symbols, each constellation symbol representing a respective set of values of a group of data bits;

iteratively traversing combinations of the constellation symbols, wherein each combination includes one constellation symbol from each of the sets of the constellation symbols and represents N data bits, and searching the traversed combinations for a combination that matches the received signals;

during traversal of the combinations of the constellation symbols, accumulating at least 2N measures of likelihood regarding the values of the data bits represented by each traversed combination;

processing the accumulated measures of likelihood to produce soft bit metrics; and reconstructing the values of the data bits carried by the multiple transmitted symbols responsively to the soft bit metrics.

In some embodiments, the soft bit metrics include Log Likelihood Ratios (LLRs) of the data bits of the simultaneously-transmitted symbols. Accumulating the measures of likelihood may include, for a given data bit of the traversed combinations, accumulating a first likelihood measure over a first subset of the traversed combinations in which a value of the given data bit is "0", and a second likelihood measure over a second subset of the traversed combinations in which the value of the given data bit is "1".

In an embodiment, accumulating the first likelihood measure includes summing the first likelihood measure over the first subset of the combinations, accumulating the second likelihood measure includes summing the second likelihood measure over the second subset of the combinations, and processing the accumulated measures of likelihood includes calculating a soft metric of the given data bit by subtracting a logarithm of the accumulated second likelihood measure from the logarithm of the accumulated first likelihood measure.

In another embodiment, accumulating the first likelihood measure includes calculating a first minimum of the first likelihood measure over the first subset of the combinations, accumulating the second likelihood measure includes calculating a second minimum of the second likelihood measure over the second subset of the combinations, and processing the accumulated measures of likelihood includes calculating a soft metric of the given data bit by subtracting the first minimum from the second minimum.

In a disclosed embodiment, traversing the combinations includes calculating for each traversed combination a solution metric that is indicative of a distance between the traversed combination and the received signals. Calculating the solution metric may include querying a Look-Up Table (LUT) that produces the solution metric as a function of one of the constellation symbols in the traversed combination and a value indicative of one of the received signals.

In an embodiment, traversing the combinations includes defining a stopping condition, and terminating traversal of the combinations responsively to meeting the stopping condition.

In some embodiments, the stopping condition causes traversing at least one additional combination after reaching the combination that matches the received signals. Traversing the combinations may include calculating for each traversed combination a first solution metric that is indicative of a distance between the traversed combination and the received signals and a second solution metric that is indicative of a distance between one of the constellation symbols in the traversed combination and one of the received signals, and terminating the traversal may include terminating the traversal when the second solution metric exceeds a best achieved value of the first solution metric by a predetermined threshold.

In an embodiment, traversing the combinations includes estimating a combination having a minimum Euclidean distance between one of the constellation symbols in the combination and one of the received signals, and initiating traversal of the combinations from the estimated combination.

In another embodiment, traversing the combinations includes defining an order for traversing a first set of the constellation symbols starting at an initial constellation symbol, selecting a sequence of the constellation symbols from the first set in accordance with the order, and deriving the constellation symbols in the other sets of the constellation symbols from the selected constellation symbols of the first set to produce the combinations.

In yet another embodiment, the constellation symbols are represented by respective signal points in an In-phase/Quadrature (I/Q) plane, and selecting the sequence of the constellation symbols includes defining a spiral in the I/Q plane that starts at the initial constellation symbol and passes through the constellation symbols of the first set, and selecting the sequence of the constellation symbols along the spiral. Selecting the sequence may include identifying a section of the spiral that does not contain constellation symbols of the first set, and omitting the identified section so as to select a subsequent constellation symbol of the first set that lies on the spiral.

In still another embodiment, selecting the sequence includes calculating Euclidean distances between at least some of the constellation symbols in the first set and at least one of the received signals, and selecting the at least some of the constellation symbols in the sequence in ascending order of the Euclidean distances. Selecting the sequence may include selecting the at least some of the constellation symbols in the sequence in ascending order of the Euclidean distances and others of the constellation symbols in the sequence in accordance with a predefined pattern.

In a disclosed embodiment, defining the order includes determining a hard-decision constellation symbol in the first set having a minimum distance from at least one of the received signals, and defining the order with respect to the hard-decision constellation symbol. Defining the order may include calculating Euclidean distances between at least some of the constellation symbols in the first set and the at least one of the received signals, and defining the order with respect to the hard-decision constellation symbol and to the Euclidean distances.

In another embodiment, receiving the spatially-multiplexed signal includes expressing the received signals in terms of a channel matrix operating on the simultaneously-transmitted symbols, and deriving the constellation symbols in the other sets includes decomposing the channel matrix by a QR decomposition process to produce a decomposed matrix, and deriving the constellation symbols in the other sets using the decomposed matrix. Decomposing the channel matrix may include extending the channel matrix with elements indicative of noise levels in the received signals, and decomposing the extended channel matrix. In some embodiments, columns of the channel matrix are reordered before decomposing the channel matrix.

In yet another embodiment, the data bits carried by the simultaneously-transmitted symbols are encoded with an Error Correction Code (ECC), and reconstructing the values of the data bits includes decoding the ECC responsively to the soft bit metrics.

There is additionally provided, in accordance with an embodiment of the present invention, a communication apparatus, including:

multiple receivers, which are coupled to receive a spatially-multiplexed signal to produce multiple respective received signals, the spatially-multiplexed signal including multiple simultaneously-transmitted symbols, which are selected from respective sets of constellation symbols, each constellation symbol representing a respective set of values of a group of data bits; and a decoder, which is coupled to iteratively traverse combinations of the constellation symbols, wherein each combination includes one constellation symbol from each of the sets of the constellation symbols and represents N data bits, to search the traversed combinations for a combination that matches the received signals, to accumulate, during traversal of the combinations of the constellation symbols, at least 2N measures of likelihood regarding the values of the data bits represented by each traversed combination, to process the accumulated measures of likelihood to produce soft bit metrics, and to output the soft metrics so as to reconstruct the values of the data bits carried by the multiple transmitted symbols.

The present invention will be more fully understood from the following detailed description of the embodiments thereof, taken together with the drawings in which:

DETAILED DESCRIPTION OF EMBODIMENTS

Overview

Figure 1:
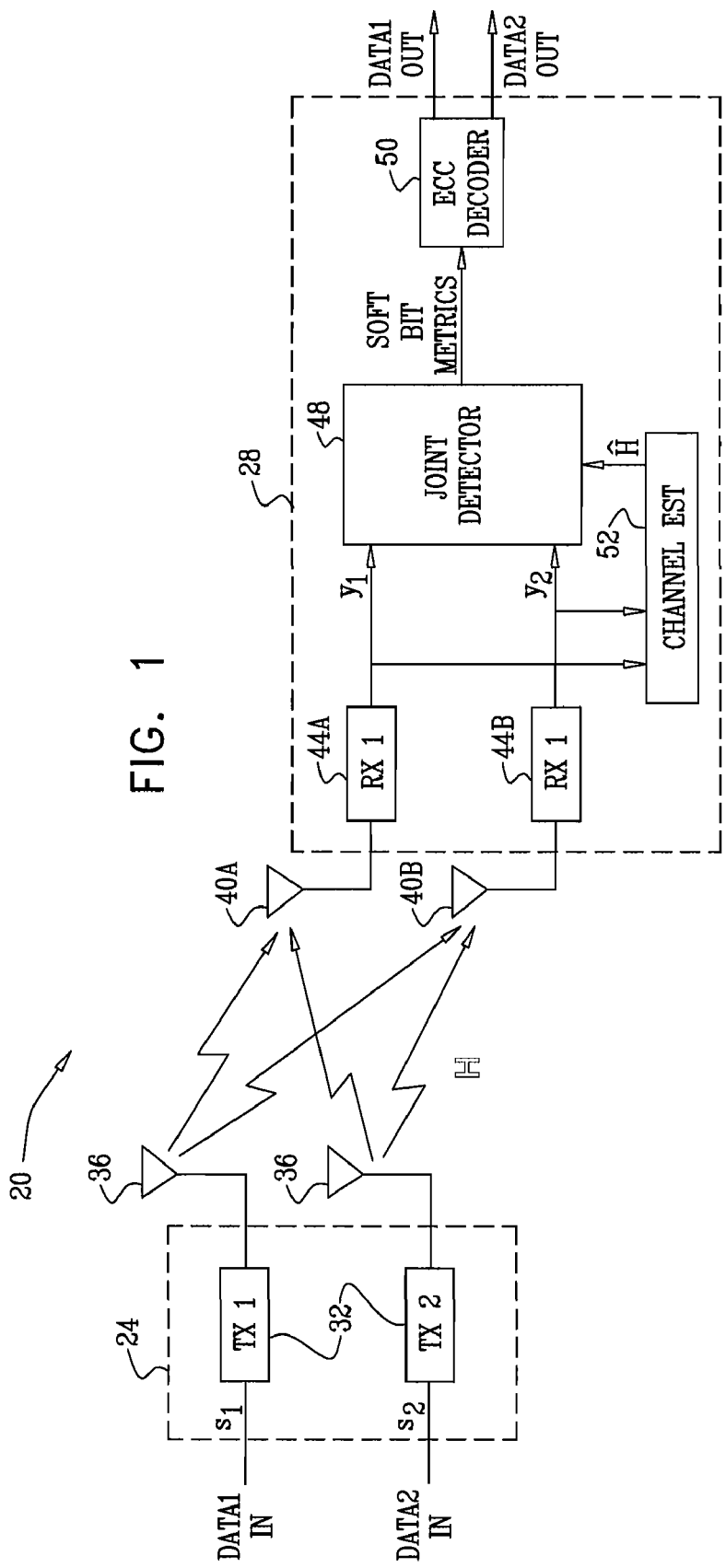
FIG. 1 is a block diagram that schematically illustrates a Multiple-Input Multiple-Output (MIMO) communication system, in accordance with an embodiment of the present invention.

Embodiments of the present invention that are described hereinbelow provide improved methods and systems for decoding spatially-multiplexed signals. In some embodiments, a transmitter comprising multiple transmission channels transmits multiple data streams simultaneously via respective different transmit antennas. Each transmission channel uses a modulation scheme in which transmitted symbols are selected from a respective constellation. A receiver comprising multiple receive antennas receives the spatially-multiplexed signal.

Each of the receive antennas thus receives a spatially-multiplexed signal, which comprises multiple received symbols. The receiver comprises a joint detector, which processes the multiple received signals and determines a combination of the constellation symbols, one from each constellation, which were most likely transmitted by the transmitter. In particular, the joint detector computes and outputs soft bit metrics, such as Log Likelihood Ratios (LLRs). Typically, the transmitter encodes the transmitted data with an Error Correcting Code (ECC), and the soft bit metrics are used by an ECC decoder in the receiver to decode the ECC and reconstruct the data.

In order to decode a certain set of symbols that are received simultaneously, the joint detector carries out an iterative search process, which examines combinations of constellation symbols. Each combination comprises one symbol from each of the multiple constellations. The joint detector traverses the symbol combinations in order to determine a combination that best matches the received symbols. For each traversed combination of constellation symbols, the detector typically computes a solution metric that quantifies the distance between the combination and the received signal. The search is terminated when a predefined stopping condition, which may depend on the solution metric, is met.

During traversal of the constellation symbol combinations, the joint detector accumulates measures of likelihood regarding the bit values of each traversed combination. When each traversed combination represents N data bits, the detector accumulates at least 2N likelihood measures. Typically, the detector maintains and updates a set of bit-related accumulators, also referred to as "buckets." Using the buckets, the joint detector accumulates the measures of likelihood according to the specific set of bit values of each symbol combination traversed during the search. When the search terminates, the detector computes the soft bit metrics by processing the accumulated likelihood measures. The data carried by the multiple transmitted symbols is then reconstructed based on the soft bit metrics.

Several exemplary search orders, solution metrics, soft bit metrics and stopping conditions are presented and discussed hereinbelow. In particular, in some embodiments the search process continues even after finding the combination having the best solution metric. Continuing the search to cover additional symbol combinations improves the quality of the accumulated likelihood measures and thus the quality of ECC decoding.

The methods and systems described herein are applicable to a wide variety of communication protocol and standards that support spatial multiplexing.

System Description

FIG. 1 is a block diagram that schematically illustrates a Multiple-Input Multiple-Output (MIMO) communication system 20, in accordance with an embodiment of the present invention. System 20 comprises a dual transmitter (TX) 24, which communicates with a dual receiver (RX) 28 over a wireless channel. Although the embodiments described herein address a system configuration having two transmit antennas and two receive antennas, the methods and systems described herein can be used in MIMO configurations having any desired number of transmit and receive antennas. The number of transmit antennas need not necessarily be equal to the number of transmit antennas.

System 20 applies spatial multiplexing in order to achieve enhanced capacity. System 20 may operate in accordance with various communication protocols or standards having various modulation schemes, such as various standards based on Orthogonal Frequency Division Multiplexing (OFDM), for example the well-known WiMAX (IEEE 802.16) standard, various Wideband Code Division Multiple Access (W-CDMA) standards, and/or any other suitable standard or protocol that supports spatial multiplexing.

Dual transmitter 24 comprises two transmitters 32, also referred to as transmission channels. Transmitters 32 transmit two separate data streams simultaneously via respective transmit antennas 36. The two transmitters process respective data streams denoted DATA1 and DATA2 to produce Radio Frequency (RF) signals, which are transmitted via transmit antennas 36.

Each of the two data streams may be encoded with an Error Correction Code (ECC). The two streams may be encoded jointly (using vertical encoding) or individually using separate encoders. Each of the two transmitters modulates the encoded data using a suitable modulation scheme, converts the modulated digital signal to an analog baseband signal, up-converts the baseband signal to RF, amplifies the RF signal and transmits it via the transmit antenna. The transmitters often perform additional functions such as digital and/or analog filtering, power control and other functions.

Each transmitter 32 transmits modulated symbols, which are selected from a predefined set of constellation symbols. Each constellation symbol corresponds to a certain combination of data bits. The constellation symbols are commonly represented as signal points in the In-phase/Quadrature (I/Q) plane. For example, a given transmitter 32 may use 16-symbol Quadrature Amplitude Modulation (16-QAM), in which the constellation comprises sixteen constellation symbols, each carrying four data bits. Alternatively, the transmitter may use 64-QAM, in which each constellation symbol carries six data bits. Further alternatively, the transmitter may use an M-symbol Phase-Shift Keying (M-PSK), or any other suitable modulation scheme. The two transmitters may use the same symbol constellation or different constellations.

The RF signals transmitted by dual transmitter 24 are received by dual receiver 28. The dual receiver comprises receive antennas 40A and 40B, which receive the signals transmitted from transmit antennas 36. Note that each receive antenna generally receives the signals transmitted by both transmit antennas. The two transmit antennas are typically mounted at a certain physical separation with respect to one another, in order to achieve spatial diversity. The receive antennas are also typically separated from one another. The wireless channels between the different transmit and receive antennas are typically assumed to be flat (i.e., not frequency-selective) and can therefore be represented by a channel matrix H, whose coefficients comprise the channel attenuations between each transmit antenna and each receive antenna.

The RF signals received by antennas 40A and 40B are processed by receivers 44A and 44B, respectively. Each receiver typically down-converts the RF signal to baseband and then converts the baseband signal to a stream of digital samples. The receivers may also perform functions such as filtering, amplification, gain control and other functions. The two sample streams produced by receivers 44A and 44B are provided to a joint detector 48. The joint detector processes the received sample streams, using methods that are described in detail below, and produces soft bit metrics. The soft bit metrics are processed by an ECC decoder 50, which decodes the ECC using the soft bit metrics and reconstructs the data (DATA1, DATA2) carried by the two received signals. (When the transmitter applies joint ECC encoding to the two data streams, the receiver typically decodes the ECC and then separates the decoded bits to reproduce the two data streams.) The reconstructed data streams are provided as output. In some embodiments, the dual receiver comprises a channel estimation module 52, which estimates the coefficients of channel matrix H based on the received samples. The estimated channel matrix, denoted $\hat{H}$, is provided to joint detector 48.

ECC decoder 50 operates on soft bit metrics, such as on Log Likelihood Ratios (LLRs), and processes the soft bit metrics to reconstruct the transmitted symbols and data. As will be shown in detail below, the methods and systems described herein provide efficient means for computing soft bit metrics for use by the ECC decoder. Various types of ECC lend themselves to soft decoding, and various types of soft decision decoders are known in the art. The ECC may comprise, for example, a block code such as a Turbo code or a Low Density Parity Check (LDPC) code, a suitable convolutional code, a trellis code or any other suitable type of ECC. The decoder may comprise any suitable decoder type that operates on soft bit metrics, such as a Turbo decoder, an LDPC decoder or a Viterbi decoder.

Each transmitter and receiver typically comprises an analog section, which carries out the analog processing functions, and a modem, which carries out the digital processing functions of the transmitter or receiver. The analog sections may be implemented, for example, using RF Integrated Circuits (RFIC), discrete components or a combination thereof. The modems may be implemented in hardware, such as using Application-Specific Integrated Circuits (ASIC) or Field-Programmable Gate Arrays (FPGA), using software or using a combination of hardware and software elements.

Joint Decoding Method Description

Embodiments of the present invention that are described herein provide improved methods and systems for decoding the spatially-multiplexed signals transmitted from transmitter 24 to receiver 28. For a given set of received signals, the methods and systems described herein determine the constellation symbols that were most likely transmitted by transmitters 32. In particular, the methods and systems described herein process the received spatially-multiplexed symbol to produce soft bit metrics, which are subsequently used by ECC decoder 50 to reconstruct the data.

The description that follows addresses the detection of a given received spatially-multiplexed signal, which comprises a pair of symbols transmitted simultaneously by the two transmitters 32. The transmitted signal is represented by a vector $$\underline{s} = \begin{bmatrix} S_1 \\ S_2 \end{bmatrix},$$

wherein $S_1$ and $S_2$ denote the symbols transmitted simultaneously by the two transmitters. The received signal is represented by a vector $$\underline{y} = \begin{bmatrix} y_1 \\ y_2 \end{bmatrix},$$

wherein $y_1$ and $y_2$ denote the signals received by receive antennas 40A and 40B, respectively. The channel coefficients are given by a matrix $$H = \begin{bmatrix} h_{11} & h_{12} \\ h_{21} & h_{22} \end{bmatrix},$$

wherein $h_{ij}$ denotes the channel attenuation between transmit antenna j and receive antenna i. In the general case, matrix H is an $N_r$-by-$N_t$ matrix, wherein $n_r$ and $n_t$ denote the number of receive and transmit antennas, respectively. The channels are assumed to be Additive White Gaussian Noise (AWGN) channels. Thus, a noise vector $$\underline{w} = \begin{bmatrix} w_1 \\ w_2 \end{bmatrix}$$

is added to the received signal. The received (observed) signal is given by $$\underline{y} = H\underline{s} + \underline{w} \qquad [1]$$

Each of the transmitted symbols $S_1$ and $S_2$ are drawn from a certain predefined constellation, in accordance with the modulation schemes used by the transmitters. The symbol constellation of the first transmitter, from which $S_1$ is selected, is denoted $C_1$. The constellation of the other transmitter, from which $S_2$ is selected, is denoted $C_2$.

The methods and systems described herein determine a pair of constellation symbols (one symbol from $C_1$ and one from $C_2$) that is closest to the observed signal $$\underline{y} = \begin{bmatrix} y_1 \\ y_2 \end{bmatrix}$$

in terms of Euclidean distance. In other words, the methods and systems described herein find the vector s that minimizes the term $|y - Hs|^2$. In the Gaussian case, this process comprises Maximum Likelihood (ML) detection. In addition, a reliability measure is associated with each of the data bits related to the determined symbols.

In some embodiments, joint detector 48 initially decomposes the channel matrix H using a QR decomposition process. The decomposition converts Equation [1] into a matrix equation in which one of the observed signals depends only on the symbol $S_2$ and the noise, and in particular does not depend on the symbol $S_1$. The detector expresses H as a product of two matrices Q and R, H=QR, such that Q comprises an orthonormal matrix (i.e., $Q \cdot Q^H = I$, wherein $(\ )^H$ denotes the conjugate transpose or Hermitian transpose operator), and R comprises an upper-triangular matrix. (Although the description that follows refers to an upper-triangular matrix, the method may be similarly implemented using a lower-triangular matrix.)

Various methods for performing QR decomposition are known in the art, and any such method can be used for decomposing channel matrix H. An alternative decomposition method, which accounts for the noise characteristics of the received signal and is sometimes preferable, is described further below. Following the decomposition of H, Equation [1] above can be written as $$\tilde{y} = Rs + \tilde{w} \qquad [2]$$

wherein $\tilde{y} = Q^H y$ and $\tilde{w} = Q^H w$. In the case of two transmit antennas and two receive antennas, Equation [2] can be written as $$\begin{bmatrix} \tilde{y}_1 \\ \tilde{y}_2 \end{bmatrix} = \begin{bmatrix} R_{11} & R_{12} \\ 0 & R_{22} \end{bmatrix} \begin{bmatrix} S_1 \\ S_2 \end{bmatrix} + \begin{bmatrix} \tilde{w}_1 \\ \tilde{w}_2 \end{bmatrix} \qquad [3]$$

wherein $R_{11}$, $R_{12}$ and $R_{22}$ denote elements of matrix R. Since $R_{21} = 0$, $S_2$ can be derived irrespective of $S_1$.

After decomposing the channel matrix, detector 48 performs an iterative search process over pairs of constellation symbols (each pair comprising one symbol from $C_1$ and one from $C_2$) in order to find the pair that is closest to y.

Detector 48 first determines an initial starting point for the search. From Equation [3], $\tilde{y}_2$ can be approximated as $$\tilde{y}_2 \approx R_{22} S_2.$$

Detector 48 rounds the approximate value of $\tilde{y}_2$ to the closest constellation symbol in $C_2$, and the result is used as the initial $S_2$ candidate symbol. Given the $S_2$ candidate, the detector derives an $S_1$ candidate symbol from constellation $C_1$ using Equation [3] by calculating $$\tilde{y}_1 \approx R_{11} S_1 + R_{12} \tilde{S}_2$$

and then rounds the result to the closest constellation symbol in $C_1$.

Detector 48 starts the iterative search from the initial $S_1$ and $S_2$ candidates. In each iteration of the search process, the detector selects a certain $S_2$ candidate symbol from $C_2$, and derives a corresponding $S_1$ candidate from $C_1$ using Equation [5]. The joint detector may traverse constellation $C_2$ in different orders. Several exemplary search orders are described further below.

For each pair of candidate constellation symbols being examined, the joint detector calculates a solution metric denoted J. The solution metric quantifies the quality of the current solution, i.e., the distance of the pair of constellation symbols from the received symbols. Metric J is given by $$J = |\tilde{y}_1 - (R_{11} \tilde{S}_1 + R_{12} \tilde{S}_2)|^2 + |\tilde{y}_2 - R_{22} \tilde{S}_2|^2$$

In some embodiments, detector 48 evaluates Equation [6] in an implementation-efficient manner. The calculation of each of the two terms in Equation [6] involves computing the square of the absolute value of a complex number. This computation is performed for each symbol combination that is traversed in the search. The absolute-square operation involves two real multiplications and one real addition. The following implementation reduces the number of operations needed for calculating J:

The second term of Equation [6] is initially calculated (up to a factor of $R_{22}$) by $\tilde{\tilde{y}} = \tilde{y}_2 / R_{22}$. Then, for each $S_2$ candidate, the detector calculates $J_2 |\tilde{\tilde{y}}_2 - S_2|^2$ using a predefined Look-Up Table (LUT), which is accessed by $S_2$ and by a quantized value of $\tilde{\tilde{y}}$. The first term of Equation [6] in initially calculated (up to a factor of $R_{11}$) by computing $\tilde{\tilde{y}} = \tilde{y}_1 / R_{11}$. Then, for each $S_2$ candidate, the detector computes $$\hat{\tilde{y}}_1 = \tilde{y}_1 - \frac{R_{12}}{R_{11}} S_2.$$

The term $$\frac{R_{12}}{R_{11}}$$

may be pre-calculated. For each $S_1$ candidate $$J_1 = |\hat{\tilde{y}}_1 - S_1|^2$$

can be calculated using the LUT described above. Finally, J is calculated by $J = R_{11} J_1 + R_{22} J_2$. In another embodiment, an LUT is accessed by a quantized value of $\tilde{\tilde{y}}_1$ and produces the nearest $S_1$ to $\tilde{\tilde{y}}_1$ and the value $J_1$ associated with $S_1$. In addition, the LUT output may comprise other values of $S_1$ with the associated values of $J_1$, as described further below.

The iterative search continues until a predetermined stopping condition, which may depend on the metric J, is met. Several exemplary stopping conditions are described further below.

During the iterative search process, the joint detector accumulates measures of likelihood regarding the bit values of the traversed candidate symbols. After the search terminates, the detector computes soft bit metrics based on the accumulated likelihood measures.

In some embodiments, the detector formats and outputs the soft bit metrics as signed numbers. The sign of the soft bit metric indicates the estimated bit value (e.g., a negative metric indicates that the estimated bit value is "1", and a positive metric indicates that the estimated bit value is "0"). The magnitude of the bit metric is indicative of the reliability measure assigned to the bit.

In some embodiments, the soft bit metrics comprise Log Likelihood Ratios (LLRs) of the bits in the two constellations symbols. For example, when both transmitters use 64-QAM modulation, each of the two constellation symbols carries six data bits. The total number of bits in a pair of constellation symbols is twelve. In the present example, the joint decoder computes and outputs twelve LLR values, one LLR for each bit.

The LLR of a given bit u is defined as the log ratio of the probability that the bit has a "0" value given a certain received symbol y, and the probability that the bit has a "1" value given the received symbol y. Formally, $LLR(u) = \ln[Pr(u=0|y)/Pr(u=1|y)]$. When the data has even a-priori probabilities (i.e., when $(Pr(0) = Pr(1) = 0.5)$, $LLR(u) = \ln[f(y|u=0)/f(y|u=1)]$, wherein f denotes the Probability Density Function (PDF) of y.

In the case of system 20, it can be shown that LLR(u) is given by $$LLR(u) = \ln\left[\sum_{S \in \{S|u=0\}} \exp\left(-\frac{J_S}{2\sigma^2}\right)\right] - \ln\left[\sum_{S \in \{S|u=1\}} \exp\left(-\frac{J_S}{2\sigma^2}\right)\right] \quad [7]$$

wherein $J_s = |\tilde{y} - Rs|^2$ denotes the solution metric J when applied to the symbol vector s. The first term of Equation [7] is summed over the constellation symbol pairs in which bit u is equal to "0", and the second term is summed over the constellation symbol pairs in which bit u is equal to "1". Using the well-known max-log approximation, Equation [7] can be approximated as $$LLR(u) \approx \min_{S \in \{S|u=1\}}\left[\frac{J_S}{2\sigma^2}\right] - \min_{S \in \{S|u=0\}}\left[\frac{J_S}{2\sigma^2}\right] \quad [8]$$

In some embodiments, the joint detector computes the soft bit metrics using Equation [7]. In alternative embodiments, the joint detector computes the soft bit metrics using the approximated Equation [8]. Further alternatively, the joint detector may compute any other suitable type of soft bit metrics.

As can be seen in Equations [7] and [8], the computation of the soft bit metrics involves accumulating measures of likelihood regarding the bit values of various constellation symbols of $C_1$ and $C_2$. In system 20, joint detector 48 accumulates the likelihood measures over the symbol pairs that are being traversed during the iterative search process.

In some embodiments, joint detector 48 maintains a set of bit-related accumulators, which accumulate the likelihood measures. The accumulators are also referred to as "buckets." Typically, the detector maintains two accumulators for each bit in the two symbol constellations. For each bit, one accumulator is associated with a hypothesis that the bit has a value of "0" and another accumulator is associated with a hypothesis that the bit is "1". For example, when each of the two symbol constellations comprises a 64-QAM constellation carrying six bits, each pair of symbols has twelve bits. In this example, detector 48 maintains twenty-four bit-related accumulators.

Typically, the joint detector initializes the accumulators before initiating the search. During the search, when the detector traverses a certain pair of constellation symbols ($S_1$ and $S_2$ candidates), it updates the appropriate accumulators with the likelihood measures of the symbols being traversed. The initialization and the specific information that is accumulated during the search may differ for different soft metrics.

For example, when using the logarithmic soft bit metrics of Equation [7], the accumulators are initialized to zero or to a small predefined value. This predefined value may depend on parameters such as the noise level, constellation size and/or other factors. In each search iteration (i.e., for every pair of $S_1$ and $S_2$ candidates) the detector adds $\exp(-J/2\sigma^2)$ to the accumulators that correspond to the bit values of the candidate pair. After the search terminates, for each bit in the symbol pair, detector 48 computes the logarithm of the accumulator value corresponding to the "1" hypothesis of the given bit, and subtracts it from the logarithm of the accumulator value corresponding to the "0" hypothesis of the given bit, to produce the soft bit metric.

When using the approximated bit metrics of Equation [8], the detector initializes the accumulators to infinity or to a large predefined value. The predefined initial value may depend on parameters such as the noise level, constellation size and/or other factors. In each search iteration, the detector examines the accumulators that correspond to the bit values of the candidate pair, and checks whether the value of J for the current candidate pair is smaller than the value that is already stored in the accumulators. If the value of J for the current candidate is smaller than the stored value, the detector stores the current value of J in the accumulators. After the search terminates, for each bit in the symbol pair, detector 48 subtracts the accumulator value corresponding to the "0" hypothesis of the given bit from the accumulator value corresponding to the "1" hypothesis of the given bit, to produce the soft bit metric. When the noise level varies between symbols, the soft bit metric may be normalized by dividing it by $2\sigma^2$.

In an alternative embodiment, the detector updates all of the accumulators that are associated with the bits of the $S_1$ candidate at each iteration, not only the accumulators that correspond to the actual bit values of the candidate. (For the $S_2$ candidate, the detector still updates only the accumulators corresponding to the actual bit values of the candidate symbol.) The accumulators that correspond to the actual bit values of the $S_1$ candidate are updated as explained above.

The other accumulators (which correspond to bit values that are opposite to the actual bit values of the $S_1$ candidate symbol) are updated as follows: The soft decision for $S_1$ for a given iteration is defined as $z=(\tilde{y}_1-R_{12}\tilde{s}_2)/R_{11}$. For each bit u of the $S_1$. candidate, the closest point to z among the points having an opposite value of bit u is chosen. This point is denoted $\tilde{\tilde{s}}_1$. A metric J is computed for the symbol pair $[\tilde{\tilde{s}}_1,\tilde{s}_2]$. This value of J is used for updating the accumulator of bit u of $S_1$ having the opposite bit value (with respect to the bit value of u in the $S_1$ candidate). The calculation of the metrics $J_1$ of the point closest to z ($S_1$) and of the points corresponding to the accumulator bits of this closest point can be implemented in a single step using a LUT, which is accessed by a quantized value of z, and produces the different $J_1$ values and bit values u of the closest point $S_1$, as described above.

Detector 48 continues the iterative search process over the pairs of constellation symbols until a predefined stopping condition is met. Various stopping conditions can be used. For example, the search may be terminated after a performing a certain maximum number of iterations, i.e., after examining a certain maximum number of $S_2$ candidates. Other stopping conditions may be threshold-based. For example, a stopping condition may specify that the search is terminated when $J>J_{BEST}+TH$, wherein $J_{BEST}$ denotes the minimum (best) value of metric J that is found so far, and TH denotes a predefined threshold. This criterion does not necessarily guarantee that the Maximum Likelihood (ML) symbol combination is traversed.

As another example, the stopping condition may specify that the search is terminated when $J_2>J_{BEST}+TH$, wherein $J_2$ denotes the error produced by the current $S_2$ candidate, i.e., $J_2=|\tilde{y}_2-R_{22}S_2|^2$. When "soft order search" (defined below) is used, this criterion guarantees that the ML symbol combination is traversed. When using the latter stopping condition, the joint detector considers $S_2$ candidate symbols whose solution metrics are worse than the best solution found so far by no more than TH. Thus, the search does not necessarily stop when the best solution metric J is found. The additional candidate symbols that are examined may contribute valuable information to the soft bit metrics. In addition, in search orders other than the "soft order search," metric $J_2$ of the additional candidates may decrease, and therefore a symbol combination whose J is smaller than $J_{BEST}$ may be obtained. This stopping condition has a dynamic behavior, in the sense that it creates a larger search radius around the optimal solution for harder cases.

Figure 2:
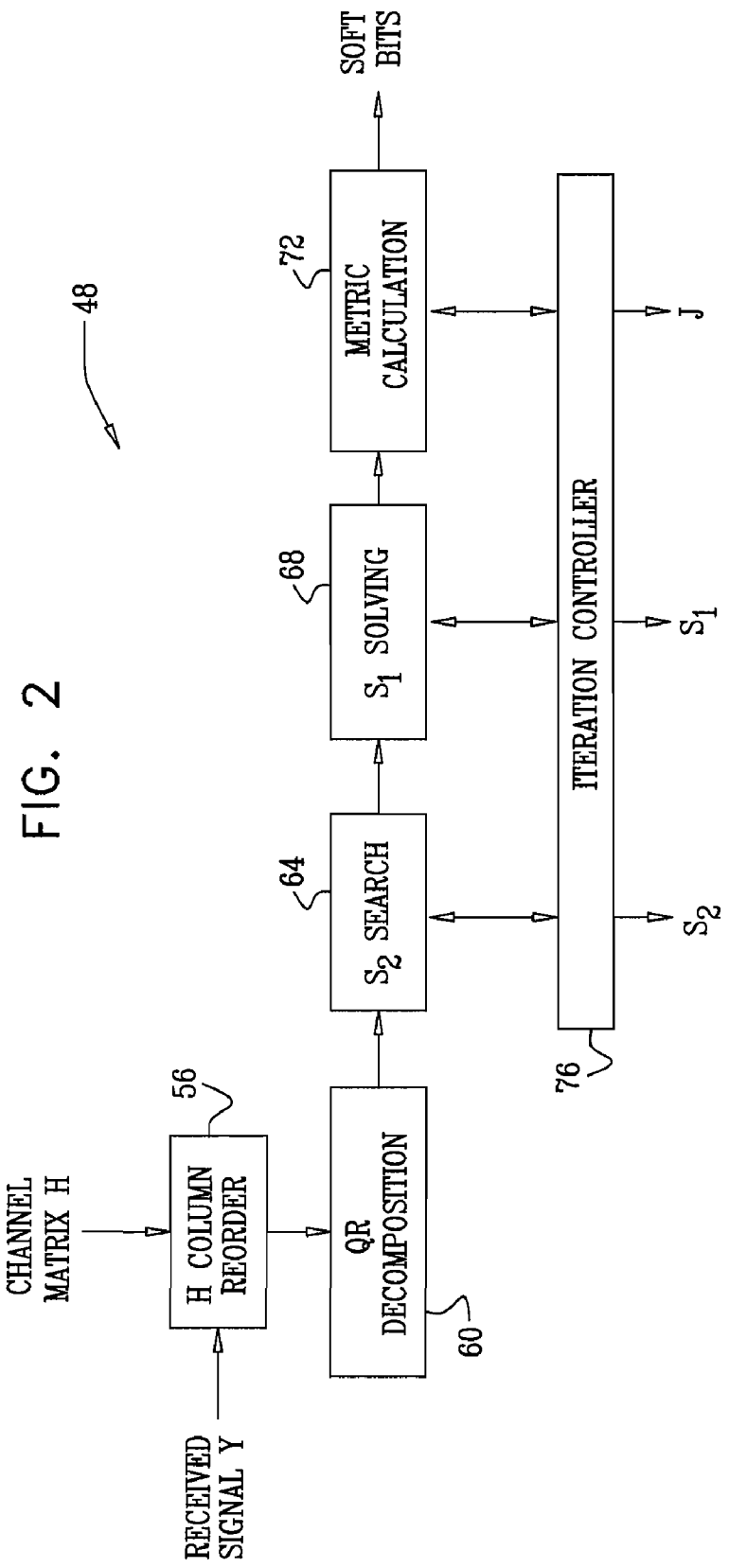
FIG. 2 is a block diagram that schematically illustrates a joint detector, in accordance with an embodiment of the present invention.

FIG. 2 is a block diagram that schematically illustrates joint detector 48, in accordance with an embodiment of the present invention. In some embodiments, detector 48 comprises a column reordering module 56, which reorders the column of channel matrix H. The reordering process is optional. The motivation and benefits of column reordering is addressed further below.

The detector comprises a decomposition module 60, which applies QR decomposition to the channel matrix H. An $S_2$ searching module 64 traverses constellation $C_2$ in accordance with a predefined search order and selects $S_2$ candidate symbols. An $S_1$ solving module 68 derives an $S_1$ candidate symbol from constellation $C_1$ for each $S_2$ candidate traversed by module 64. A metric calculation module 72 computes solution metric J for each pair of $S_1$ and $S_2$ candidates. Module 72 also computes and outputs the soft bit metrics. An iteration controller 76 controls the search process. In particular, the iteration controller evaluates the stopping condition and terminates the search when the condition is met.

Typically, joint detector 48 is implemented as part of a modem in receiver 28. The joint detector may be implemented in hardware, such as in an ASIC or FPGA, using software or using a combination of hardware and software elements.

Figure 3:
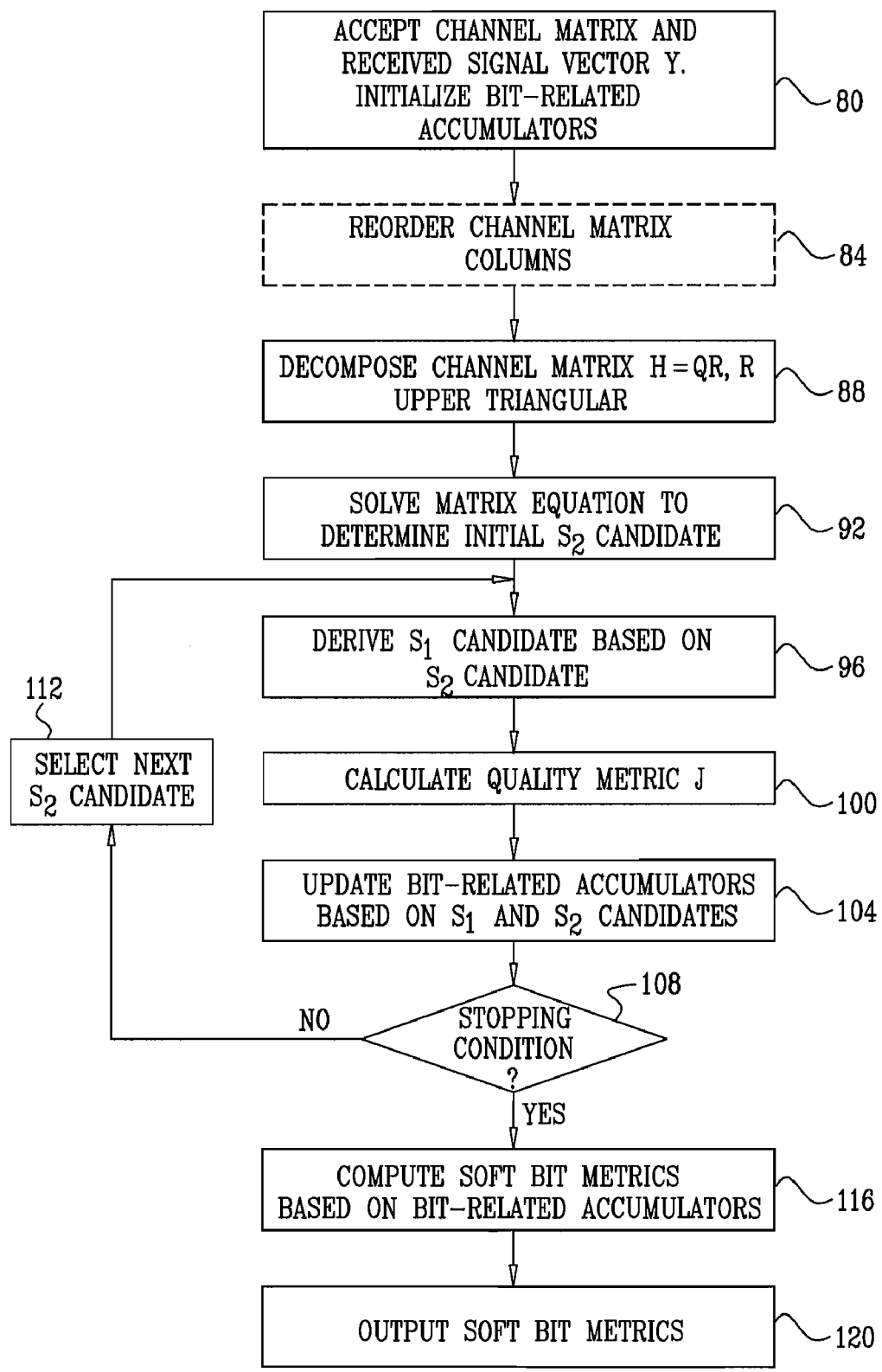
FIG. 3 is a flow chart that schematically illustrates a method for decoding spatially-multiplexed signals, in accordance with an embodiment of the present invention.

FIG. 3 is a flow chart that schematically illustrates a method, carried out by joint detector 48, for decoding spatially-multiplexed signals, in accordance with an embodiment of the present invention. The method begins with detector 48 accepting a channel matrix H and a received spatially-multiplexed signal vector y, at an input step 80. In some embodiments, the detector may accept an estimated channel matrix $\hat{H}$ from channel estimation module 52. The joint detector initializes the bit-related accumulators, as explained above, at step 80. Detector 48 may optionally reorder the columns of channel matrix H before initiating the search, at a reordering step 84.

Joint detector 48 decomposes matrix H using QR decomposition, at a decomposition step 88. The detector then uses Equation [3] above to produce an initial candidate for $S_2$, at an initial $S_2$ candidate calculation step 92. Given the $S_2$ candidate symbol determined at step 92, the detector derives an $S_1$ candidate symbol from constellation $C_1$, at an $S_1$ candidate calculation step 96. The detector derives the $S_1$ candidate symbol from Equation [5], and then rounds the result to the closest constellation symbol in $C_1$.

The resulting pair of constellation symbols $[\tilde{S}_1, \tilde{S}_2]$ is commonly known as the Babai point. The initially-selected $S_1$ symbol provides the best metric for $S_2$ alone, but not necessarily the best overall metric. Therefore, the Babai point is often not the best solution, i.e., not the pair of constellation symbols that are closest to the received symbols in terms of Euclidean distance. The detector uses the Babai point as the starting point for an iterative search that attempts to find the best solution.

In each iteration, detector 48 computes the solution metric J for the current pair of constellation symbols, at a solution metric computation step 100. The detector updates the bit-related accumulators with likelihood measures pertaining to the bit values of the current pair of constellation symbols being examined, at a bucket updating step 104. Detector 48 checks whether the applicable stopping condition is met, at a stopping condition evaluation step 108. If the stopping condition is not yet met, the detector selects the next $S_2$ candidate symbol, at a next candidate selection step 112. The next $S_2$ candidate is selected in accordance with the search order being used. The method then loops back to step 96 above, and detector 48 derives the next $S_1$ candidate symbol and proceeds with the next search iteration.

If, on the other hand, the stopping condition is met at step 108, the joint detector computes the soft bit metrics (e.g., LLRs) based on the accumulated likelihood measures, at a bit metric computation step 116. The detector outputs the soft bit metrics, at an output step 120. Typically, the soft bit metrics are provided to ECC decoder 50, which decodes the ECC and reconstructs the data based on the soft bit metrics.

Exemplary Search Orders

When conducting the iterative search process, detector 48 may select $S_2$ candidate symbols (i.e., search over the constellation symbols of constellation $C_2$) in accordance with different orders.

Figure 4:
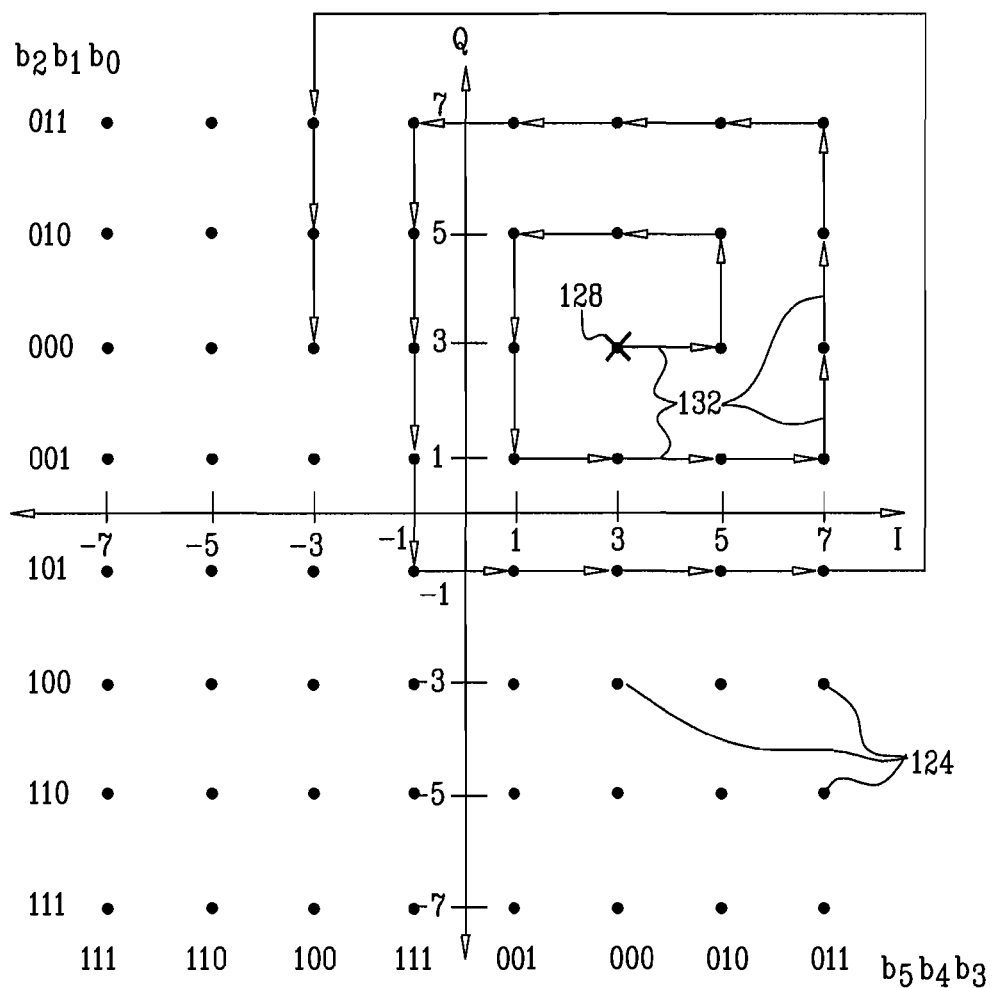
FIGS. 4 and 5 are signal-space diagrams showing search orders for traversing a symbol constellation, in accordance with embodiments of the present invention.

FIG. 4 is a signal-space diagram showing an exemplary search order for traversing the $C_2$ symbol constellation, in accordance with an embodiment of the present invention. In the present example, the $C_2$ constellation comprises a 64-QAM constellation, which comprises sixty-four constellation symbols 124 that lie on a square grid in the I/Q plane. The search order of FIG. 4 begins at an initial symbol 128, which comprises the Babai point defined above. Joint detector 48 selects $C_2$ candidate symbols that gradually move further away from Babai point 128 in a spiral manner. The search order is shown by arrows 132 in the figure.

On one hand, the spiral search is relatively straightforward to implement. On the other hand, the search is not monotonically-increasing in terms of Euclidean distance from the received signal $y_2$, which may increase the number of iterations.

In the example of FIG. 4, the spiral search begins by selecting the right-hand-side nearest neighbor of the Babai point. The detector may alternatively choose to begin the search with another nearest neighbor of the Babai point. In some embodiments, detector 48 selects the initial direction in which to initiate the spiral search (i.e., whether to initially go down, up, left or right from the Babai point), specifically for each search process. For example, the detector may choose the nearest neighbor that is closest to the soft received signal $y_2$. Alternatively, the detector may use a certain initial direction for all searches.

For a given initial direction of the spiral search, the detector may select the next constellation symbol in the spiral from two possible candidates. In other words, once the initial direction (up, down, left or right) of the spiral is selected, the detector may select whether to search in a clockwise or in a counterclockwise orientation. In some embodiments, the detector can choose the constellation symbol that is closer to the received signal $y_2$. The detector may select the first and second constellation symbols in the search (following the Babai point) using a LUT that is accessed by the Babai point and $y_2$ (or, equivalently, by the Babai point and the difference between the Babai point and $y_2$). The selection of the first two symbols fully determines the spiral search path.

Note that the spiral search order may at some point reach the edge of the constellation. When reaching the edge, the detector may determine the next valid constellation symbol that should be traversed, and jump directly to this symbol. In FIG. 4, for example, after traversing the symbol at coordinates {7,−1}, the detector may jump directly to the symbol at coordinates {−3,7}. Alternatively, in a reduced-complexity implementation, the detector may follow the spiral path coordinate-by-coordinate, regardless of whether the coordinates correspond to valid constellation symbols. When a given traversed coordinate is outside the constellation, the detector moves to the next coordinate along the spiral path.

Figure 5:
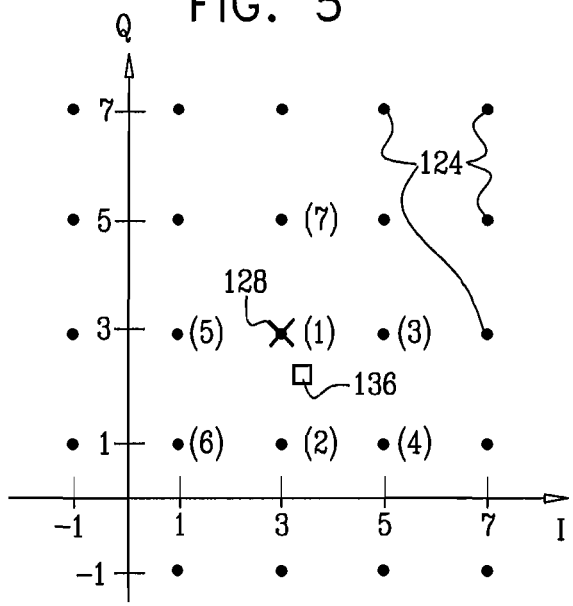

FIG. 5 is a signal-space diagram showing another exemplary search order for traversing the $C_2$ symbol constellation, in accordance with an alternative embodiment of the present invention. In the example of FIG. 5, detector 48 traverses the $C_2$ symbol constellation is ascending order of Euclidean distance from the soft received symbol $y_2$. This method is referred to herein as a "soft order search." FIG. 5 shows a single quadrant of the 64-QAM $C_2$ symbol constellation. A soft received symbol 136 is shown near Babai point 128. The first seven constellation symbols 124 being traversed are marked with numbers (1) ... (7) according to the search order. The first traversed symbol is the Babai point at coordinates {3,3}, which is denoted (1). The next symbol is the symbol at coordinates {3,1}, which is marked (2). The search continues in ascending order of Euclidean distance from soft symbol 136.

The search method of FIG. 5 can be implemented by maintaining a Look-Up Table (LUT) that indicates the desired selection of constellation symbol for each possible location of the soft received symbol in a square among the constellation symbols. In some embodiments, the area of a square that lies between four constellation symbols is quantized, such as at a resolution of sixteen points between adjacent constellation symbols, and the LUT holds the desired selection order of constellation symbols for every possible location of the soft received symbol within the square. Typically, the method of FIG. 5 is more complex than the method of FIG. 4, but provides a faster convergence time.

In an alternative embodiment, the decoder first performs a hard decision (slicing) on the soft received symbol, and then follows a predetermined search order with respect to the hard decision constellation symbol (which is the Babai point). This method is referred to herein as a "hard order search." For example, the search may progress in ascending order of Euclidean distance from the hard decision constellation symbol.

Note that in many cases the constellation comprises multiple constellation symbols having the same distance from the hard decision symbol. For example, in the 64-QAM constellation the hard decision symbol typically has four nearest neighbors from which the search may begin. In some embodiments, the detector traverses symbols having the same distance from the hard decision symbol in ascending order of their Euclidean distance from the soft received symbol.

When using the hard order search, the search order typically depends on the symbol from which the search begins. The different search orders can be stored in a LUT that is accessed by the hard decision symbol from which the search begins. The size of the LUT can be reduced by exploiting symmetries in the constellation. For example, the LUT may consider only a single quadrant, and the detector can derive search orders for searches that begin in other quadrants by symmetry. Moreover, in some cases, a certain search order is used for symbols that are located in the interior of the constellation, and another search order is used for symbols that are located on the edges of the constellation.

In yet another embodiment, the search may initiate with a soft order search and then, if needed, revert to a hard order search. For example, the detector may start a soft order search for a certain number of iterations (e.g., eight iterations), assuming that in most cases the solution lies near the Babai point. If the stopping condition is not met after a predefined number of soft search iterations, the detector may revert to explore more distant candidates using hard searching. Further alternatively, the decoder may use other search orders in which some of the traversed candidates are determined in ascending order of Euclidean distance, and others are determined in accordance with a predetermined order or pattern.

Alternative or Decomposition Method

In the description above, detector 48 decomposes the channel matrix H and represents it as H=QR, such that Q is orthonormal and R is upper-triangular. This method is commonly known as Zero Forcing (ZF) QR decomposition. In alternative embodiments, the detector may decompose H while considering the noise power in the received signal. An extended channel matrix is defined as $$\underline{H} = \begin{bmatrix} H \\ \sigma_n I_{nT} \end{bmatrix} \quad [9]$$

wherein $\sigma_n$ denotes a regularization parameter, nT denotes the number of channels (antennas) and $I_{nT}$ denotes an identity matrix having nT rows and columns. When $\sigma_n$ is equal to the noise variance per channel, the decomposition process comprises the well-known Minimum Mean Square Error (MMSE) QR decomposition. The joint detector decomposes the extended channel matrix by $$\underline{H} = \underline{Q} \cdot \underline{R} = \begin{bmatrix} Q_1 \\ Q_2 \end{bmatrix} R = \begin{bmatrix} Q_1 R \\ Q_2 R \end{bmatrix} \quad [10]$$

The search process continues as described in FIG. 3 above, by replacing H=QR with H=$Q_1$R. Although Q is orthonormal, $Q_1$ is generally not orthonormal. Therefore, equation [2] is often not exact ($Q_1^H$H=$Q_1^H Q_1$R≠R), but the approximation is usually sufficient.

Typically but not necessarily, MMSE decomposition is expected to provide better results than ZF decomposition for short searches, since it takes the noise characteristics into consideration. For longer searches that reach higher Euclidean distances from the Babai point, ZF decomposition may be preferable, since MMSE decomposition may distort the Euclidean distances.

Channel Matrix Column Reordering

As can be seen from Equation [4], the search solution depends strongly on the value of $R_{22}$. When R22 is small with respect to the other elements of R, the solution may suffer from considerable noise enhancement. Thus, it may be preferable to perform QR decomposition such that $R_{22}$ is relatively large. For this purpose, in some embodiments detector 48 reorders the columns of channel matrix H before decomposing it, thus exchanging the roles of $S_1$ and $S_2$.

In the case of two transmit antennas and two receive antennas, i.e., $$H = \begin{bmatrix} h_{11} & h_{12} \\ h_{21} & h_{22} \end{bmatrix},$$

detector 48 may switch between columns of the channel matrix if $|h_{11}|^2+|h_{21}|^2>|h_{12}|^2+|h_{22}|^2$. Column reordering typically reduces the number of search iterations, at the expense of additional operations on the channel matrix prior to the search.

Although the description that follows addresses a spatially-multiplexed signal originating from two transmission channels, the methods and systems described herein can be used to decode spatially-multiplexed signals having any number of simultaneous transmitted signals.

The number of data streams transmitted from the transmitter need not necessarily be equal to the number of transmit antennas. Generally, the number of streams can be equal to or smaller than the minimum between the number of transmit antennas and the number of receive antennas. Additionally, each data stream is not necessarily directed to a single transmit antenna. One or more of the data streams may be beamformed using respective precoding vectors, as are known in the art. In such cases, the system defines a number of virtual antennas that are respectively associated with the data streams. The effective channel that is associated with these virtual antennas is given by H·P wherein P is a matrix whose columns comprise the precoding vectors. In the context of the present patent application, terms such as "transmit antenna" and "transmission channel" are meant to cover virtual antennas and channels, as well.

Although the embodiments described herein mainly address decoding spatially-multiplexed signals in MIMO wireless communication systems, the principles of the present invention can also be used for other applications, such as in multi-wire communication applications that suffer from strong crosstalk.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
receiving a spatially-multiplexed signal using multiple receivers to produce multiple respective received signals, the spatially-multiplexed signal comprising multiple simultaneously-transmitted symbols, which are selected from respective sets of constellation symbols, each constellation symbol representing a respective set of values of a group of data bits;
iteratively traversing combinations of the constellation symbols, wherein each combination comprises one constellation symbol from each of the sets of the constellation symbols and represents N data bits, and wherein each combination is traversed at most once, and searching the traversed combinations for a combination that matches the received signals;
during traversal of the combinations of the constellation symbols, accumulating at least 2N measures of likelihood regarding the values of the data bits represented by each traversed combination;
processing the accumulated measures of likelihood, which were computed by traversing each combination at most once, to produce soft bit metrics; and
reconstructing the values of the data bits carried by the multiple transmitted symbols responsively to the soft bit metrics,
wherein traversing the combinations comprises defining a stopping condition, and terminating traversal of the combinations responsively to meeting the stopping condition, and
wherein traversing the combinations comprises calculating for each traversed combination a first solution metric that is indicative of a distance between the traversed combination and the received signals and a second solution metric that is indicative of a distance between one of the constellation symbols in the traversed combination and one of the received signals, and wherein terminating the traversal comprises terminating the traversal when the second solution metric exceeds a best achieved value of the first solution metric by a predetermined threshold.

2. The method according to claim 1, wherein the soft bit metrics comprise Log Likelihood Ratios (LLRs) of the data bits of the simultaneously-transmitted symbols.

3. The method according to claim 1, wherein accumulating the measures of likelihood comprises, for a given data bit of the traversed combinations, accumulating a first likelihood measure over a first subset of the traversed combinations in which a value of the given data bit is "0", and a second likelihood measure over a second subset of the traversed combinations in which the value of the given data bit is "1".

4. The method according to claim 3, wherein accumulating the first likelihood measure comprises summing the first likelihood measure over the first subset of the combinations, wherein accumulating the second likelihood measure comprises summing the second likelihood measure over the second subset of the combinations, and wherein processing the accumulated measures of likelihood comprises calculating a soft metric of the given data bit by subtracting a logarithm of the accumulated second likelihood measure from the logarithm of the accumulated first likelihood measure.

5. The method according to claim 3, wherein accumulating the first likelihood measure comprises calculating a first minimum of the first likelihood measure over the first subset of the combinations, wherein accumulating the second likelihood measure comprises calculating a second minimum of the second likelihood measure over the second subset of the combinations, and wherein processing the accumulated measures of likelihood comprises calculating a soft metric of the given data bit by subtracting the first minimum from the second minimum.

6. The method according to claim 1, wherein traversing the combinations comprises calculating for each traversed combination a solution metric that is indicative of a distance between the traversed combination and the received signals.

7. The method according to claim 6, wherein calculating the solution metric comprises querying a Look-Up Table (LUT) that produces the solution metric as a function of one of the constellation symbols in the traversed combination and a value indicative of one of the received signals.

8. The method according to claim 1, wherein the stopping condition causes traversing at least one additional combination after reaching the combination that matches the received signals.

9. The method according to claim 1, wherein traversing the combinations comprises estimating a combination having a minimum Euclidean distance between one of the constellation symbols in the combination and one of the received signals, and initiating traversal of the combinations from the estimated combination.

10. The method according to claim 1, wherein traversing the combinations comprises defining an order for traversing a first set of the constellation symbols starting at an initial constellation symbol, selecting a sequence of the constellation symbols from the first set in accordance with the order, and deriving the constellation symbols in the other sets of the constellation symbols from the selected constellation symbols of the first set to produce the combinations.

11. The method according to claim 10, wherein the constellation symbols are represented by respective signal points in an In-phase/Quadrature (I/Q) plane, and wherein selecting the sequence of the constellation symbols comprises defining a spiral in the I/Q plane that starts at the initial constellation symbol and passes through the constellation symbols of the first set, and selecting the sequence of the constellation symbols along the spiral.

12. The method according to claim 11, wherein selecting the sequence comprises identifying a section of the spiral that does not contain constellation symbols of the first set, and omitting the identified section so as to select a subsequent constellation symbol of the first set that lies on the spiral.

13. The method according to claim 10, wherein selecting the sequence comprises calculating Euclidean distances between at least some of the constellation symbols in the first set and at least one of the received signals, and selecting the at least some of the constellation symbols in the sequence in ascending order of the Euclidean distances.

14. The method according to claim 13, wherein selecting the sequence comprises selecting the at least some of the constellation symbols in the sequence in ascending order of the Euclidean distances and others of the constellation symbols in the sequence in accordance with a predefined pattern.

15. The method according to claim 10, wherein defining the order comprises determining a hard-decision constellation symbol in the first set having a minimum distance from at least one of the received signals, and defining the order with respect to the hard-decision constellation symbol.

16. The method according to claim 15, wherein defining the order comprises calculating Euclidean distances between at least some of the constellation symbols in the first set and the at least one of the received signals, and defining the order with respect to the hard-decision constellation symbol and to the Euclidean distances.

17. The method according to claim 10, wherein receiving the spatially-multiplexed signal comprises expressing the received signals in terms of a channel matrix operating on the simultaneously-transmitted symbols, and wherein deriving the constellation symbols in the other sets comprises decomposing the channel matrix by a QR decomposition process to produce a decomposed matrix, and deriving the constellation symbols in the other sets using the decomposed matrix.

18. The method according to claim 17, and comprising reordering columns of the channel matrix before decomposing the channel matrix.

19. The method according to claim 1, wherein the data bits carried by the simultaneously-transmitted symbols are encoded with an Error Correction Code (ECC), and wherein reconstructing the values of the data bits comprises decoding the ECC responsively to the soft bit metrics.

20. A method for communication, comprising:
receiving a spatially-multiplexed signal using multiple receivers to produce multiple respective received signals, the spatially-multiplexed signal comprising multiple simultaneously-transmitted symbols, which are selected from respective sets of constellation symbols, each constellation symbol representing a respective set of values of a group of data bits;
iteratively traversing combinations of the constellation symbols, wherein each combination comprises one constellation symbol from each of the sets of the constellation symbols and represents N data bits, and wherein each combination is traversed at most once, and searching the traversed combinations for a combination that matches the received signals;
during traversal of the combinations of the constellation symbols, accumulating at least 2N measures of likelihood regarding the values of the data bits represented by each traversed combination;
processing the accumulated measures of likelihood, which were computed by traversing each combination at most once, to produce soft bit metrics; and
reconstructing the values of the data bits carried by the multiple transmitted symbols responsively to the soft bit metrics,
wherein traversing the combinations comprises defining an order for traversing a first set of the constellation symbols starting at an initial constellation symbol, selecting a sequence of the constellation symbols from the first set in accordance with the order, and deriving the constellation symbols in the other sets of the constellation symbols from the selected constellation symbols of the first set to produce the combinations,
wherein receiving the spatially-multiplexed signal comprises expressing the received signals in terms of a channel matrix operating on the simultaneously-transmitted symbols, and wherein deriving the constellation symbols in the other sets comprises decomposing the channel matrix by a QR decomposition process to produce a decomposed matrix, and deriving the constellation symbols in the other sets using the decomposed matrix, and
wherein decomposing the channel matrix comprises extending the channel matrix with elements indicative of noise levels in the received signals, and decomposing the extended channel matrix.

21. A communication apparatus, comprising:
multiple receivers, which are coupled to receive a spatially-multiplexed signal to produce multiple respective received signals, the spatially-multiplexed signal comprising multiple simultaneously-transmitted symbols, which are selected from respective sets of constellation symbols, each constellation symbol representing a respective set of values of a group of data bits; and
a decoder, which is coupled to iteratively traverse combinations of the constellation symbols, wherein each combination comprises one constellation symbol from each of the sets of the constellation symbols and represents N data bits, and wherein each combination is traversed at most once, to search the traversed combinations for a combination that matches the received signals, to accumulate, during traversal of the combinations of the constellation symbols, at least 2N measures of likelihood regarding the values of the data bits represented by each traversed combination, to process the accumulated measures of likelihood, which were computed by traversing each combination at most once, so as to produce soft bit metrics, and to output the soft metrics so as to reconstruct the values of the data bits carried by the multiple transmitted symbols,
wherein the decoder is coupled to terminate traversal of the combinations responsively to meeting a predefined stopping condition, and
wherein the decoder is coupled to calculate for each traversed combination a first solution metric that is indicative of a distance between the traversed combination and the received signals and a second solution metric that is indicative of a distance between one of the constellation symbols in the traversed combination and one of the received signals, and to terminate the traversal when the second solution metric exceeds a best achieved value of the first solution metric by a predetermined threshold.

22. The apparatus according to claim 21, wherein the soft bit metrics comprise Log Likelihood Ratios (LLRs) of the data bits of the simultaneously-transmitted symbols.

23. The apparatus according to claim 21, wherein, for a given data bit of the traversed combinations, the decoder is coupled to accumulate a first likelihood measure over a first subset of the traversed combinations in which a value of the given data bit is "0", and a second likelihood measure over a second subset of the traversed combinations in which the value of the given data bit is "1".

24. The apparatus according to claim 23, wherein the decoder is coupled to sum the first likelihood measure over the first subset of the combinations, to sum the second likelihood measure over the second subset of the combinations, and to calculate a soft metric of the given data bit by subtracting a logarithm of the accumulated second likelihood measure from the logarithm of the accumulated first likelihood measure.

25. The apparatus according to claim 23, wherein the decoder is coupled to calculate a first minimum of the first likelihood measure over the first subset of the combinations, to calculate a second minimum of the second likelihood measure over the second subset of the combinations, and to calculate a soft metric of the given data bit by subtracting the first minimum from the second minimum.

26. The apparatus according to claim 21, wherein the decoder is coupled to calculate for each traversed combination a solution metric that is indicative of a distance between the traversed combination and the received signals.

27. The apparatus according to claim 26, wherein the decoder is coupled to calculate the solution metric by querying a Look-Up Table (LUT) that produces the solution metric as a function of one of the constellation symbols in the traversed combination and a value indicative of one of the received signals.

28. The apparatus according to claim 21, wherein the decoder is coupled to traverse at least one additional combination after reaching the combination that matches the received signals.

29. The apparatus according to claim 21, wherein the decoder is coupled to estimate a combination having a minimum Euclidean distance between one of the constellation symbols in the combination and one of the received signals, and to initiate traversal of the combinations from the estimated combination.

30. The apparatus according to claim 21, wherein the decoder is coupled to define an order for traversing a first set of the constellation symbols starting at an initial constellation symbol, to select a sequence of the constellation symbols from the first set in accordance with the order, and to derive the constellation symbols in the other sets of the constellation symbols from the selected constellation symbols of the first set to produce the combinations.

31. The apparatus according to claim 30, wherein the constellation symbols are represented by respective signal points in an In-phase/Quadrature (I/Q) plane, and wherein the decoder is coupled to define a spiral in the I/Q plane that starts at the initial constellation symbol and passes through the constellation symbols of the first set, and to select the sequence of the constellation symbols along the spiral.

32. The apparatus according to claim 31, wherein the decoder is coupled to identify a section of the spiral that does not contain constellation symbols of the first set, and to omit the identified section so as to select a subsequent constellation symbol of the first set that lies on the spiral.

33. The apparatus according to claim 30, wherein the decoder is coupled to calculate Euclidean distances between at least some of the constellation symbols in the first set and at least one of the received signals, and to select the at least some of the constellation symbols in the sequence in ascending order of the Euclidean distances.

34. The apparatus according to claim 33, wherein the decoder is coupled to select the at least some of the constellation symbols in the sequence in ascending order of the Euclidean distances and others of the constellation symbols in the sequence in accordance with a predefined pattern.

35. The apparatus according to claim 30, wherein the decoder is coupled to determine a hard-decision constellation symbol in the first set having a minimum distance from at least one of the received signals, and to define the order with respect to the hard-decision constellation symbol.

36. The apparatus according to claim 35, wherein the decoder is coupled to calculate Euclidean distances between at least some of the constellation symbols in the first set and at least one of the received signals, and to define the order with respect to the hard-decision constellation symbol and to the Euclidean distances.

37. The apparatus according to claim 30, wherein the decoder is coupled to express the received signals in terms of a channel matrix operating on the simultaneously-transmitted symbols, to decompose the channel matrix by a QR decomposition process to produce a decomposed matrix, and to derive the constellation symbols in the other sets using the decomposed matrix.

38. The apparatus according to claim 37, wherein the decoder is coupled to reorder columns of the channel matrix before decomposing the channel matrix.

39. The apparatus according to claim 21, wherein the data bits carried by the simultaneously-transmitted symbols are encoded with an Error Correction Code (ECC), and comprising an ECC decoder, which is coupled to decode the ECC responsively to the soft bit metrics, so as to reconstruct the values of the data bits.

40. A communication apparatus, comprising:
multiple receivers, which are coupled to receive a spatially-multiplexed signal to produce multiple respective received signals, the spatially-multiplexed signal comprising multiple simultaneously-transmitted symbols, which are selected from respective sets of constellation symbols, each constellation symbol representing a respective set of values of a group of data bits; and
a decoder, which is coupled to iteratively traverse combinations of the constellation symbols, wherein each combination comprises one constellation symbol from each of the sets of the constellation symbols and represents N data bits, and wherein each combination is traversed at most once, to search the traversed combinations for a combination that matches the received signals, to accumulate, during traversal of the combinations of the constellation symbols, at least 2N measures of likelihood regarding the values of the data bits represented by each traversed combination, to process the accumulated measures of likelihood, which were computed by traversing each combination at most once, so as to produce soft bit metrics, and to output the soft metrics so as to reconstruct the values of the data bits carried by the multiple transmitted symbols,
wherein the decoder is coupled to define an order for traversing a first set of the constellation symbols starting at an initial constellation symbol, to select a sequence of the constellation symbols from the first set in accordance with the order, and to derive the constellation symbols in the other sets of the constellation symbols from the selected constellation symbols of the first set to produce the combinations,
wherein the decoder is coupled to express the received signals in terms of a channel matrix operating on the simultaneously-transmitted symbols, to decompose the channel matrix by a QR decomposition process to produce a decomposed matrix, and to derive the constellation symbols in the other sets using the decomposed matrix, and
wherein the decoder is coupled to extend the channel matrix with elements indicative of noise levels in the received signals, and to decompose the extended channel matrix.

* * * * *